United States Patent [19]
Chuang

[11] Patent Number: 5,297,774
[45] Date of Patent: Mar. 29, 1994

[54] COMBINATION FOOT AND HAND OPERATED FAUCET ATTACHMENT

[76] Inventor: Huo-Lien Chuang, 4 Fl. No. 17, Lane 281, Hsian St. Sec. 1, Peitou, District Taipei, Taiwan

[21] Appl. No.: 39,823

[22] Filed: Mar. 30, 1993

[51] Int. Cl.⁵ ............................... F16K 31/12
[52] U.S. Cl. ..................... 251/57; 251/259; 137/801; 137/901
[58] Field of Search ............ 251/57, 82, 259; 137/522, 801, 901

[56] References Cited

U.S. PATENT DOCUMENTS

| | | | |
|---|---|---|---|
| 881,208 | 3/1908 | Strater | 137/901 |
| 937,513 | 10/1909 | Deiller | 251/259 |
| 1,093,117 | 4/1914 | Deiller | 251/259 |
| 1,497,054 | 6/1924 | Allabach | 251/259 |
| 2,146,225 | 2/1939 | Picut | 251/259 |
| 2,308,478 | 1/1943 | Lingold | 251/57 |
| 2,839,264 | 6/1958 | Trubert | 251/57 |
| 4,052,035 | 10/1977 | Kenny et al. | 251/57 |
| 4,729,135 | 3/1988 | Titterington | 251/57 |

Primary Examiner—A. Michael Chambers
Attorney, Agent, or Firm—Bacon & Thomas

[57] ABSTRACT

A foot-operated faucet including a foot-compressed bulb which can be compressed by foot to create and transfer air pressure through a hose onto a membrane in a valve body mounted on a general faucet, whereby the membrane can be expanded to push a ball plug away, permitting the water to flow out, and when the bulb is released, the air pressure is eliminated and the faucet is shut off, a rotary switch being disposed on the valve body and connected with a lever, whereby when the switch is rotated, the lever moves the ball plug away, permitting the water to continuously flow out.

5 Claims, 7 Drawing Sheets

COMBINATION FOOT AND HAND OPERATED FAUCET ATTACHMENT

BACKGROUND OF THE INVENTION

The present invention relates to a foot-operated faucet and more particularly to a faucet fitted on an outlet of a general faucet, including a foot-compressed bulb which can be compressed by foot to create and transfer air pressure through a hose onto a membrane in a valve body mounted on a general faucet, whereby the membrane can be expanded to push a ball plug away, permitting the water to flow out. A rotary switch is disposed on the valve body and connected with a lever, whereby when the switch is rotated, the lever moves the ball plug away, permitting the water to continuously flow out.

U.S. Pat. No. 4052035 discloses a remotely controlled valve which includes a foot-operated control member capable of creating air pressure by way of compression and transferring the air pressure through a guide pipe to a pressure inlet for pushing away a piston. The piston then moves away a ball valve so a to permit the water to flow out. When the control member is released, the piston is restored to its original position by a spring and the ball valve suffers the water pressure to again block the water outlet.

Some drawbacks in the above arrangement are as follows:

1. When the piston contacts the surrounding wall too loosely, a leak will take place, while when the piston contacts the wall too closely, the piston will suffer greater frictional force when moved and thus cannot be easily operated.

2. The water outlet blocked by the ball valve is located on a lateral side and the ball valve blocks the outlet due to the water pressure, so that when the water pressure is lowered, due gravity, the ball valve will drop and fail to completely block the water outlet, making a part of water leak through the clearance between the ball valve and the outlet.

3. The remotely controlled valve can be only operated for temporary water discharging while when the water is to be discharged for a long time, the user must continuously step on the foot-operated member. Moreover, the structure of the remotely controlled valve is too complicated and thus cannot be easily assembled. Also, the foot-compressed structure of such valve is rough and the manufacturing cost thereof is high.

SUMMARY OF THE INVENTION

It is therefore a primary object of this invention to provide a foot-operated faucet which can control the amount of the discharged water in a foot-stepping manner.

It is a further object of this invention to provide the above faucet which is provided with a rotary switch, permitting the faucet to discharge for a long time.

It is still a further object of this invention to provide the above faucet which can be directly easily mounted on a general faucet.

According to the above arrangement, the present invention includes a foot-compressed bulb which can be stepped on by a foot to create air pressure and transfer the air pressure through a hose onto a membrane disposed in a valve body mounted on a general faucet, whereby the membrane can be expanded to push a ball plug away, permitting the water to flow out, and when the bulb is released, the air pressure is eliminated and the faucet is shut off, a rotary switch being disposed on the valve body and connected with a lever, whereby when the switch is rotated, the lever moves the ball plug away, permitting the water to continuously flow out.

The advantages of the present invention over U.S. Pat. No. 4052035 are as follows:

1. The membrane of the present invention has simpler structure than the piston of U.S. Pat. No. 4052035 and is free from the frictional force so that the membrane can be more smoothly operated.

2. The membrane expanded to push the ball plug is completely sealed so that no leak will take place.

3. The water outlet blocked by the ball plug of the present invention is faces downward, so that the ball plug will block the outlet due to gravitation even without water pressure. As a result, in case of water cut, the ball plug can still effectively block the outlet and prevent leakage of water. When the water is normally supplied, the ball plug is under both the gravitation and the water pressure so that no leakage will happen.

4. Because the membrane is free from frictional force, the foot-compressed bulb for driving the membrane can be designed with relatively small structure so as to enhance the appearance of the product.

5. The present invention is further provided with a rotary switch which permits the water to be discharged for a long time.

6. U.S. Pat. No. 4052035 needs a corresponding thread portion to be formed on the water outlet of the original faucet for mounting the valve while general faucets are not provided with such thread portion. In contrast therewith, the present invention only employs several screws for mounting the valve on the general faucet.

In view of the above, it is known that the present invention provides a foot-operated faucet which eliminates all the drawbacks of the conventional device.

DETAILED DESCRIPTION OF THE PREFERRED EMBODIMENT

Figure 1:
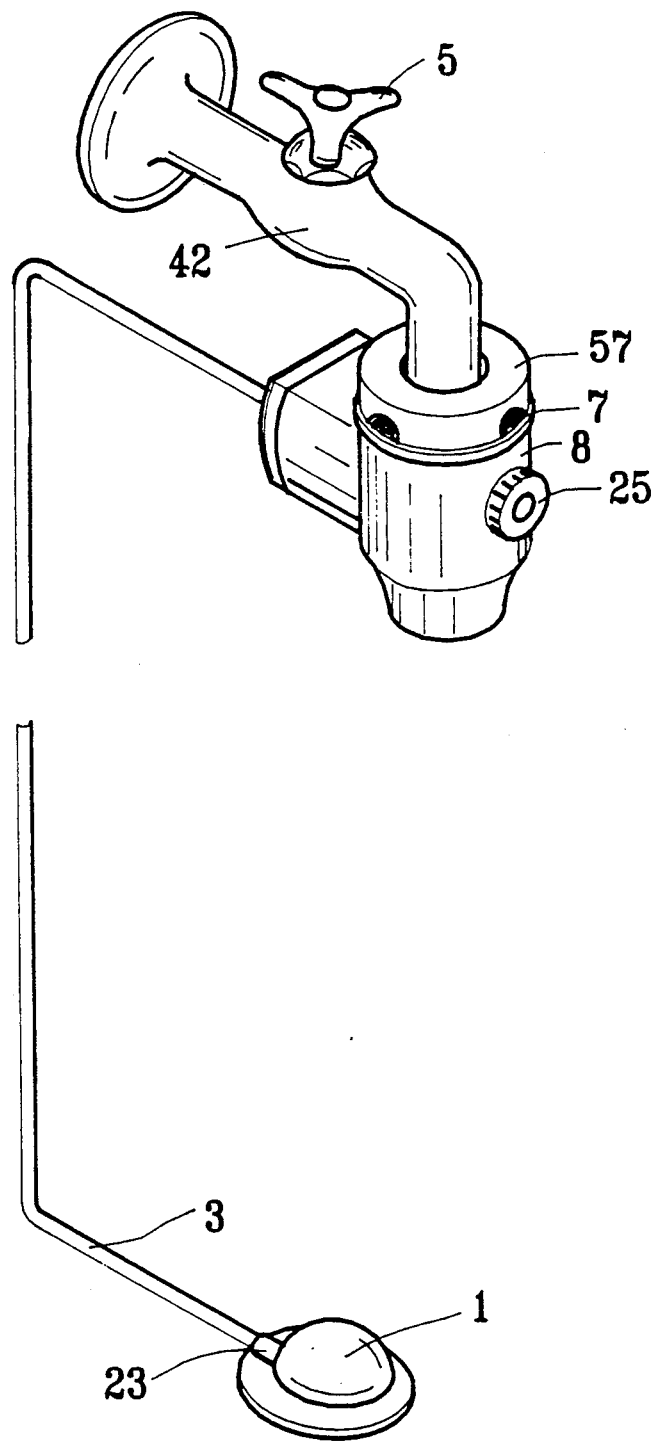
FIG. 1 is a perspective view of the present invention.
Figure 2:
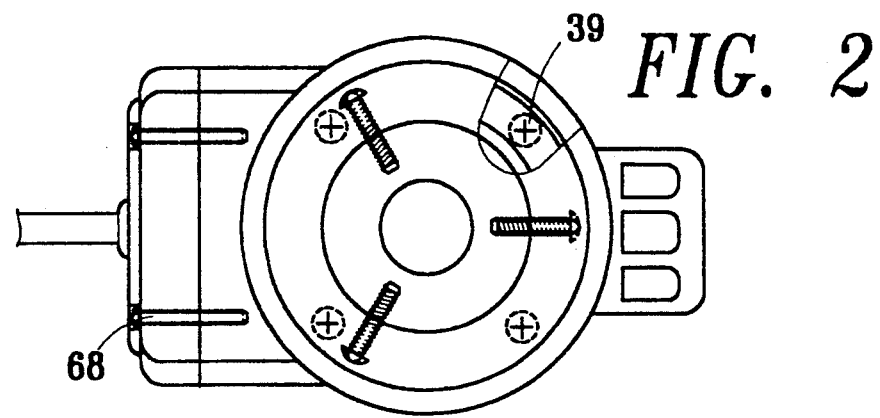
FIG. 2 is an upper view of the present invention in a not activated state.
Figure 3:
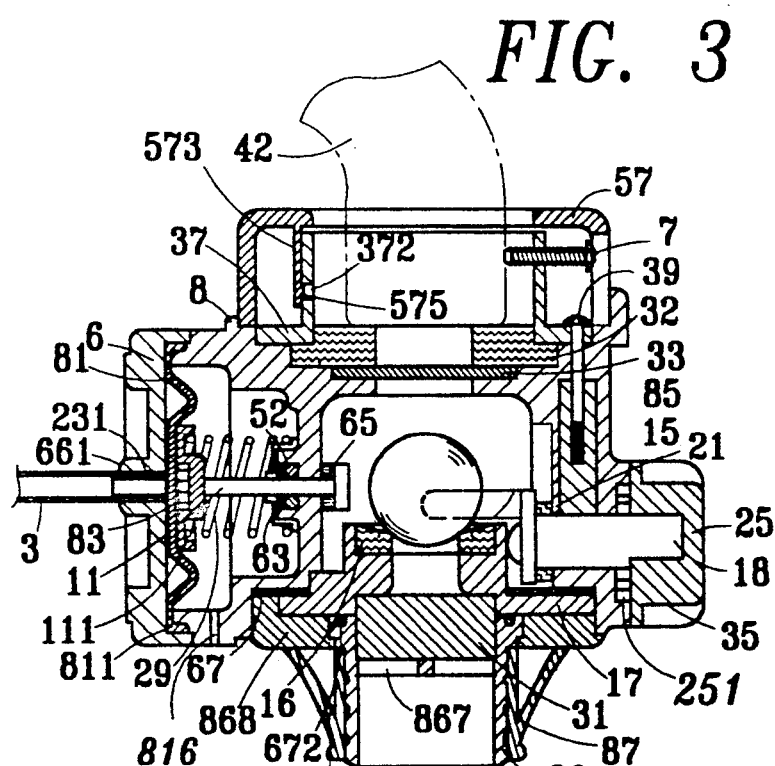
FIG. 3 is a sectional view of the present invention in a not activated state.
Figure 4:
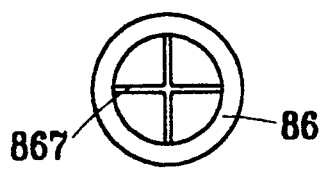
FIG. 4 is a lower view of the outlet mouth of the present invention.
Figure 10:
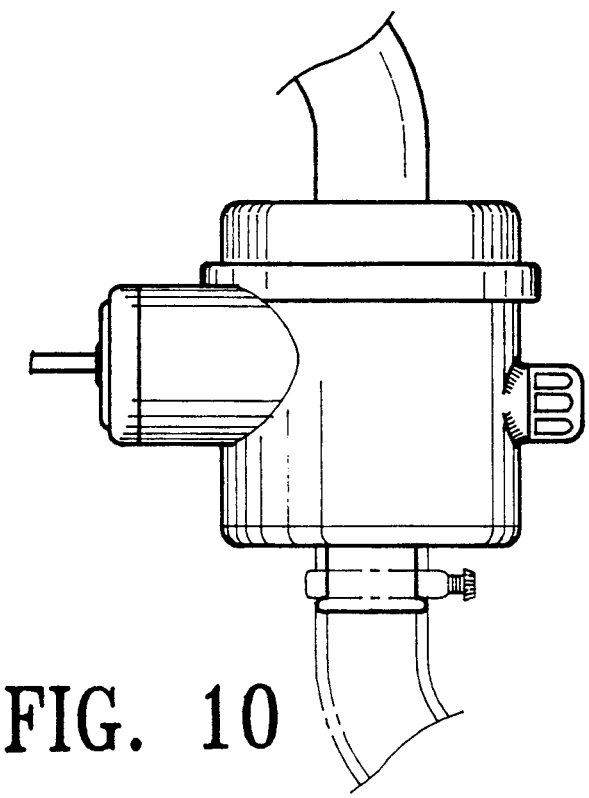
FIG. 10 is a side view of the present invention mounted on a water pipe with the decorative cover removed.
Figure 11:
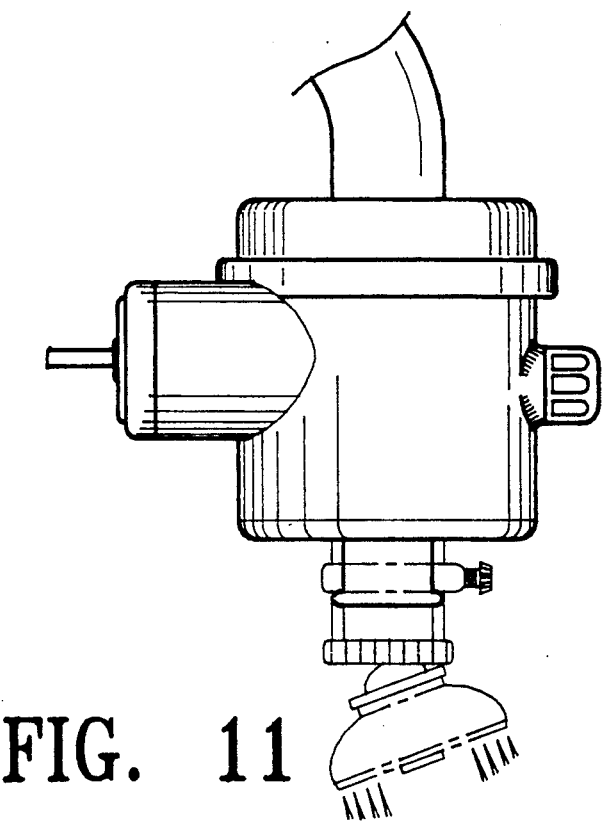
FIG. 11 shows that the present invention can be fitted with other fittings such as a sprinkler.

Please first refer to FIGS. 1, 2 and 3. The present invention includes a semi-spheric foot-compressed bulb 1 made of rubber or soft plastic, a hose 3 connected to an outlet of the bulb 1 by a connecting mouth 23 at one end and connected to a connector 661 by another connecting mouth 231 at the other end. On inner wall of an outer cover 6 is disposed a membrane 81, which is made of rubber and is inflatable. The membrane 81 abuts against a spring seat 111 which is secured to a push rod 11 by nut 83. A spring 29 is fitted with the push rod 11 and opposed against the spring seat 111 to pres the membrane 81 against inner wall of the cover 6 on left side and abuts against a washer 63 and a leakproof ring 52 on right side. On right side of the push rod 11 is fitted with a leakproof ring 65 to prevent the water in a valve chamber 85 from leaking outsides. The cover 6 is fitted on outer side of the membrane 81 and secured on left side of a valve 8 by four screws 68 so that the cover 6 is closely associated with a section 811 of the membrane 811 and the left side of the valve 8. Three fixing screws 7 fasten the valve 8 on a general faucet 42. A rubber washer 32 is closely connected with a rubber washer 32 to prevent leakage. A decorative cover 57 has three recesses for receiving the screws 7. The cover 57 has three clamping plates 573 and three projections 575 for inserting into three holes 372 of a sleeve 37 and holding the same so as to fix the cover. The sleeve 37 has three threaded holes for three screws 7 to secure the sleeve 37 on the outlet of the faucet 42. The valve 8 has a valve chamber 85 disposed with a ball plug 15 which is pressed by water pressure in normal condition. The valve body 8 has a switch 25 on the right side, which is fixed on a lever 18 by a screw 35. A rubber washer 21 is disposed between the lever 18 and the valve 8, whereby when the lever 18 is rotated, the same suffers a frictional resistance and thus cannot be easily rotated and must be rotated by force exerted by fingers so as to activate the ball plug 15. The switch 25 and lever 18 are described in detail in FIGS. 7 and 8, wherein a rubber washer 16 is disposed under the ball plug 15 to connect with a central recess of a valve seat 17. A rubber washer 67 is disposed around the valve seat 17 and a filtering member 31 is disposed under the central hole for filtering the water. An outlet mouth 86 is disposed thereunder and a cross-shaped member 867 is disposed above the outlet mouth 86 for support of the filtering member 31. Please refer to FIG. 4 which is a bottom view of the outlet mouth 86, wherein a leakproof ring 672 is disposed at a joint portion between the valve seat 17 and outlet mouth 86. The outlet mouth 86 is upward fitted under the valve body 8 by a valve body fixing seat 868 and four screws 39 are extended through the four holes of the sleeve 37, the valve body 8 and the rubber washer 67 and the valve seat 17 to be fastened in the four thread holes of the fixing seat 868. A decorative cover 87 is fitted on outer side of the outlet mouth 86 and locked by a flange thereof. When the cover 87 is removed, a water pipe or other fittings such as a sprinkler can be alternatively fitted thereon as required as shown in FIGS. 10 and 11.

Figure 5:
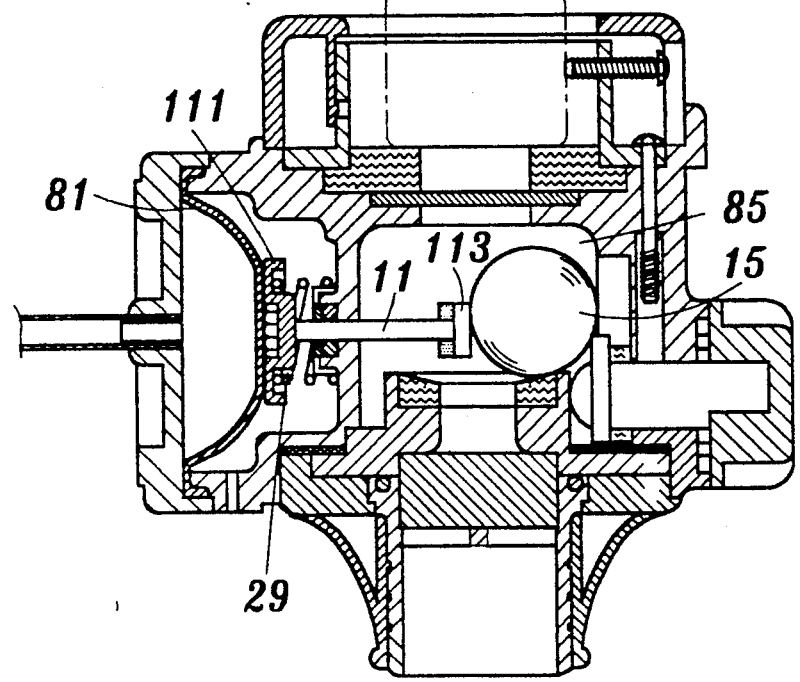
FIG. 5 is a sectional view of the present invention in an activated state.

Please refer to FIG. 5. When a switch 5 on the faucet 42 is totally opened, the water flows into the valve chamber 85 and is blocked by the valve ball 15. When the foot-operated bulb 1 is compressed, the air pressure is transferred through the hose 3 onto the membrane 81 to expand the same and thus push the push rod 11 right, making a head end 113 thereof push the ball plug 15 away, permitting the water to flow through the central hole of the rubber ring 16 of the valve seat. For shutting off the water, the foot can leave the bulb 1 to create a sucking effect so as to suck the air in the membrane 81 back through the hose 3, so that the push rod 11 is bounded back by the spring 29 and the ball plug 15 is restored to its original position to block the central hole of the rubber ring 16 to stop the water flow. At this time, the water-stopping state as shown in FIG. 3 is restored.

Figure 6:
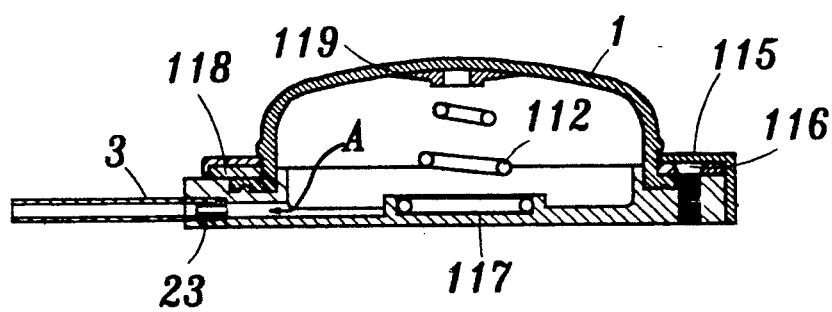
FIG. 6 is a sectional view of the foot-operated bulb of the present invention.

Please refer to FIG. 6, wherein the hose 3 is connected to a lateral hole of a base 117 of the bulb 1 by the mouth 23. A spring 112 is disposed in the bulb 1 between a washer 119 and the base 117. An upper cover 118 is disposed on the base 117 and secured thereon by five screws 116 which also clamping lateral flanges of the bulb 1. A decorative cover 115 is disposed on the upper cover 118 and abuts against the rubber skin of the bulb 1, whereby when the bulb 1 is compressed, the air goes through the passage A into the valve body 8 while when the bulb 1 is released, the bulb 1 is restored by the spring 112.

Figure 7:
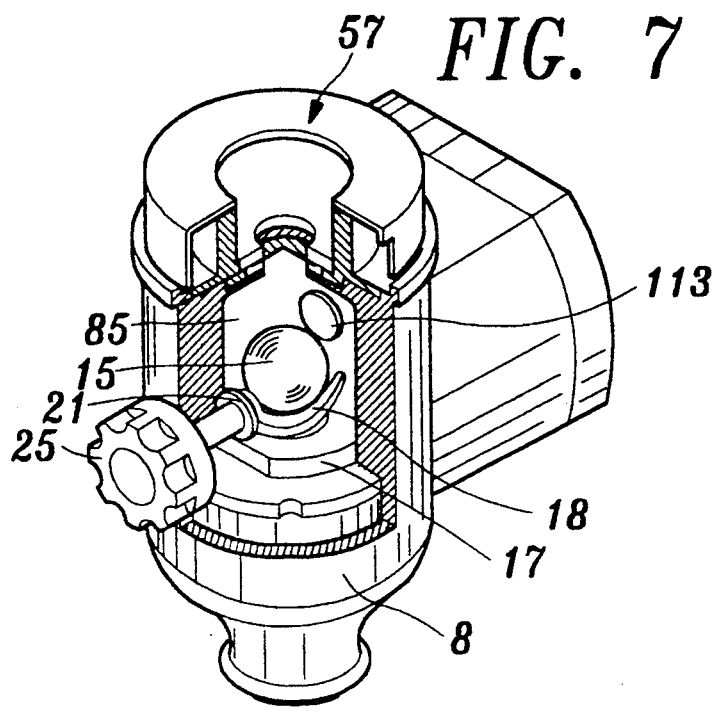
FIG. 7 is a partially sectional view of the valve body provided with a rotary switch.
Figure 8:
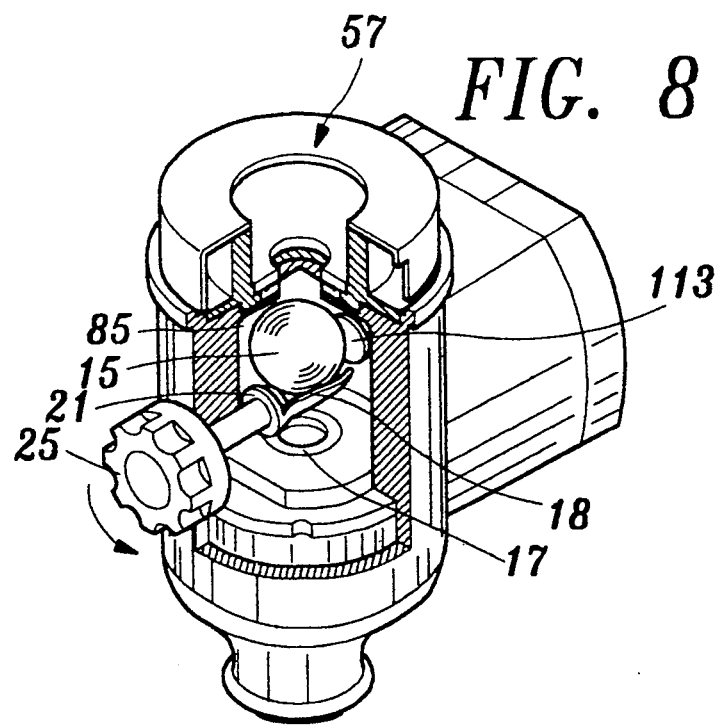
FIG. 8 is a view according to FIG. 7 showing the movement of the rotary switch.

Please refer to FIGS. 7 and 8, wherein a rotary switch 25 is disposed on the valve body 8 for long time water discharging function. When the switch 25 is rotated in a direction denoted by the arrow, a curved lever 18 of the switch 25 will move the ball plug 15 laterally and hold the same, permitting the water in the chamber 85 to flow out. By means of the switch 25, the displacement of the ball plug 15 can be adjusted to control the amount of the water flow. Therefore, for long time water discharging, the bulb 1 is not necessary to be continuously compressed.

Figure 9:
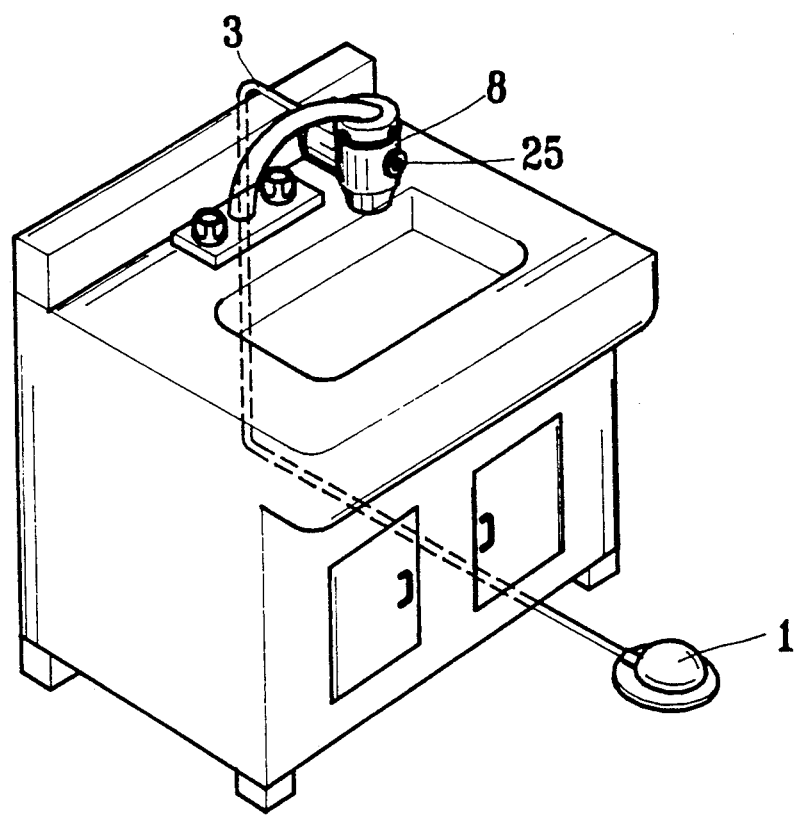
FIG. 9 shows the application of the present invention to a cold/hot water faucet.

Please refer to FIG. 9, the valve body 8 of the present invention can be applied to a general domestically used hot/cold water faucet, wherein after the faucet is properly adjusted, the bulb can be foot-compressed for temporary water discharging while the rotary switch 25 ca be rotated for long time water discharging.

Figure 12:
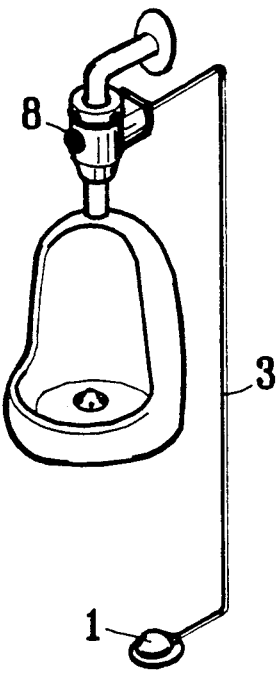
FIG. 12 shows that the present invention can be fitted on a urinal bowl.
Figure 13:
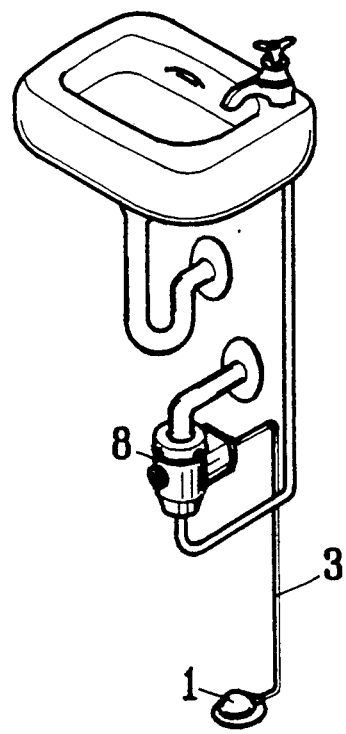
FIG. 13 shows that the present invention is mounted on a water pipe between a general faucet and a water source.

Please refer to FIGS. 12 and 13, the above valve body 8 can be also applied to a urinal bowl for flushing or connected to a water pipe between a water source and a general faucet for facilitating the using of the water.

What is claimed is:

1. A combination foot and hand operable valve attachment comprising:
   a) a valve body defining an inlet, a valve chamber communicating with the inlet and an outlet communicating with the valve chamber and having a valve seat adjacent to the outlet;
   b) a ball plug located in the valve chamber such that it is biased against the valve seat by gravity to close the outlet;
   c) a first valve actuation means comprising:
      i) a push rod slidably located in the valve body so as to be movable between a retracted position in which it is out of contact with the ball plug and an extended position in which it displaces the ball plug off the valve seat to open the outlet;
      ii) a flexible membrane operatively connected to the push rod and to the valve body; and,
      iii) foot operated pneumatic bulb means operatively associated with the flexible membrane so as to move the push rod between its retracted and extended positions; and, d) a second valve actuation means comprising:
  i) a lever actuator rotatably attached to the valve body, the lever movable between a first position in which the ball plug is permitted to seat on the valve seat to close the opening and a second position in which the lever displaces the ball plug from the valve seat so as to open the opening; and,
  ii) manually manipulable handle means located externally of the valve body and operatively connected to the lever actuator so as to move the lever between its first and second positions.

2. The foot and hand operable valve attachment of claim 1 further comprising attachment means to removably attach the valve body to a faucet.

3. The foot and hand operable valve attachment of claim 2 wherein the attachment means comprises:
  a) a sleeve attachment to the valve body adjacent to the inlet; and,
  b) at least one threaded fastener member extending through the sleeve.

4. The foot and hand operable valve attachment of claim 1 further comprising filter element disposed in the outlet.

5. The foot and hand operable valve attachment of claim 1 further comprising means to attached the valve body to a conduit.

* * * * *